(12) United States Patent
Umezawa et al.

(10) Patent No.: US 8,422,353 B2
(45) Date of Patent: *Apr. 16, 2013

(54) OPTICAL RECORDING MEDIUM FOR WRITING DATA USING MULTIPLE PULSES

(75) Inventors: Kazuyo Umezawa, Yokohama (JP); Seiji Morita, Yokohama (JP); Koji Takazawa, Tokyo (JP); Naomasa Nakamura, Yokohama (JP); Naoki Morishita, Yokohama (JP); Shinichi Katsuda, Yamato (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/252,806

(22) Filed: Oct. 4, 2011

(65) Prior Publication Data

US 2012/0026851 A1  Feb. 2, 2012

Related U.S. Application Data

(62) Division of application No. 12/795,385, filed on Jun. 7, 2010, now Pat. No. 8,059,523, which is a division of application No. 12/140,549, filed on Jun. 17, 2008, now abandoned.

(30) Foreign Application Priority Data

Jun. 18, 2007  (JP) ................................. 2007-160307

(51) Int. Cl.
  *G11B 11/00* (2006.01)
(52) U.S. Cl.
  USPC .................................... 369/275.4; 369/59.11
(58) Field of Classification Search ............... 369/275.4, 369/275.3, 275.2, 275.1, 59.11, 13.27, 13.54, 369/57.5; 428/64.1, 64.2, 64.4; 430/321, 430/320, 270.1, 270.11, 270.13
See application file for complete search history.

(56) References Cited

U.S. PATENT DOCUMENTS 5,732,061 A  3/1998  Kirino et al.
6,160,784 A  12/2000  Maeda et al.
(Continued)

FOREIGN PATENT DOCUMENTS

CN  1552063 A  12/2004
CN  1581309 A  2/2005
(Continued)

OTHER PUBLICATIONS

Office Action issued May 24, 2011 in Japanese Patent Application No. 2007-160307 filed Jun. 18, 2007 (w/English translation).

(Continued)

*Primary Examiner* — Tan X Dinh
(74) *Attorney, Agent, or Firm* — Oblon, Spivak, McClelland, Maier & Neustadt, L.L.P.

(57) ABSTRACT

An optical recording medium including a plurality of recording layers to record/reproduce information using light with a predetermined wavelength, the information being recorded on one of the recording layers using a mark and a space, wherein a channel clock period T is provided for recording the mark on one of the recording layers. A plurality of pulses, including a last pulse arranged at an end of the pulses, are used to record the mark with length 3T, the mark being recorded with a condition that a width of the last pulse is minimum 0T and maximum 1.10T, in which a first subsequent level lower than a peak power level of the last pulse is arranged next to the last pulse, and a second subsequent level lower than the peak power level but higher than the first subsequent level is arranged next to the first subsequent level.

4 Claims, 7 Drawing Sheets

U.S. PATENT DOCUMENTS

| | | |
|---|---|---|
| 6,529,467 B2 | 3/2003 | Miyamoto et al. |
| 6,891,790 B2 | 5/2005 | Fukusawa et al. |
| 7,342,871 B2 | 3/2008 | Park et al. |
| 7,471,605 B2 | 12/2008 | Fujita et al. |
| 7,554,899 B2 | 6/2009 | Lee |
| 7,602,675 B2 | 10/2009 | Ohno |
| 7,995,442 B2 * | 8/2011 | Takazawa et al. ......... 369/59.11 |
| 8,134,899 B2 * | 3/2012 | Takazawa et al. ......... 369/59.11 |
| 8,139,459 B2 * | 3/2012 | Takazawa et al. ......... 369/59.11 |
| 8,149,672 B2 * | 4/2012 | Takazawa et al. ........... 369/59.1 |
| 8,154,970 B2 * | 4/2012 | Takazawa et al. ......... 369/59.11 |
| 8,154,971 B2 * | 4/2012 | Takazawa et al. ......... 369/59.11 |
| 2003/0223333 A1 | 12/2003 | Park et al. |
| 2004/0141437 A1 | 7/2004 | Usami |
| 2005/0018589 A1 | 1/2005 | Mizushima et al. |
| 2005/0286390 A1 | 12/2005 | Minemura et al. |
| 2009/0175151 A1 | 7/2009 | Miyashita et al. |
| 2009/0175155 A1 | 7/2009 | Nakata et al. |
| 2009/0180361 A1 | 7/2009 | Nakata et al. |
| 2010/0039921 A1 | 2/2010 | Shoji et al. |
| 2011/0194384 A1 * | 8/2011 | Takazawa et al. ......... 369/30.03 |
| 2011/0194395 A1 * | 8/2011 | Takazawa et al. ......... 369/59.19 |
| 2011/0199869 A1 * | 8/2011 | Takazawa et al. ......... 369/30.03 |
| 2011/0199870 A1 * | 8/2011 | Takazawa et al. ......... 369/30.03 |
| 2011/0199873 A1 * | 8/2011 | Takazawa et al. ........... 369/47.5 |
| 2011/0199874 A1 * | 8/2011 | Takazawa et al. ......... 369/47.28 |
| 2011/0199878 A1 * | 8/2011 | Takazawa et al. ......... 369/59.19 |
| 2011/0199879 A1 * | 8/2011 | Takazawa et al. ......... 369/59.19 |
| 2011/0199881 A1 * | 8/2011 | Takazawa et al. ......... 369/59.23 |

FOREIGN PATENT DOCUMENTS

| | | |
|---|---|---|
| CN | 1767015 A | 5/2006 |
| JP | 7-320300 | 12/1995 |
| JP | 11-208118 | 8/1999 |
| JP | 2003-191641 | 7/2003 |
| JP | 2004-158168 | 6/2004 |
| JP | 2005-271587 | 10/2005 |
| JP | 2006-205683 | 8/2006 |
| JP | 2006-244673 | 9/2006 |
| JP | 2006-351114 | 12/2006 |

OTHER PUBLICATIONS

Office Action issued Mar. 2, 2012, in Chinese Patent Application No. 201010265392.6 (with English-language translation).

Chinese Office Action issued Jul. 2, 2012, in China Patent Application No. 201010265392.6 (with English Translation).

* cited by examiner

|  | Molecular formula (molecular weight) | $\lambda$ max (solvent) | Decomposition temperature (heat quantity) |
|---|---|---|---|
| Dye A | $C_{57}H_{59}CoN_{12}O_{10}$ (1131.10) | 577nm $\varepsilon = 1.0 \times 10^5$ (MeOH) | 286°C (730mJ/mg) |
| Dye B | $C_{36}H_{32}N_{14}NiO_8$ (871.45) | 611nm $\varepsilon = 8.9 \times 10^4$ (MeOH) | 249°C (336mJ/mg) |
| Dye C | $C_{55}H_{61}CoN_{10}O_8$ (1049.08) | 542nm $\varepsilon = 1.6 \times 10^5$ (MeOH) | 259°C (795mJ/mg) |
| Dye D | $C_{57}H_{57}CoN_{12}O_{10}$ (1129.07) | 447nm $\varepsilon = 6.9 \times 10^4$ (MeOH) | 269°C (474mJ/mg) |

OPTICAL RECORDING MEDIUM FOR WRITING DATA USING MULTIPLE PULSES

CROSS-REFERENCE TO RELATED APPLICATIONS

This application is a division of and claims the benefit of priority under 35 U.S.C. §120 from U.S. Ser. No. 12/795,385 filed Jun. 7, 2010, which is a divisional of U.S. Ser. No. 12/140,549 filed Jun. 17, 2008, and claims the benefit of priority from Japanese Patent Application No. 2007-160307 filed Jun. 18, 2007, the entire contents of each of which are incorporated herein by reference.

BACKGROUND

1. Field

One embodiment of the present invention relates to an information recording medium capable of recording and reproducing information by using a short-wavelength laser beam such as a blue laser beam and, more particularly, to a write-once information recording medium, an information recording medium capable of recording information in multiple layers, and a disk apparatus using the information recording medium.

2. Description of the Related Art

Optical disks are roughly classified into three types of disks, i.e., a ROM disk for playback only, a write-once R disk, and a rewritable RW or RAM disk. As the volume of information increases, optical disks are being required to have large capacities and high transfer rates. To meet the market demand for large capacities, a DVD-R disk having two recoding layers instead of a normal single recording layer is being developed in order to increase the capacity even when using a recording system using the same laser wavelength.

To further increase the capacity of an optical disk, an optical disk called an HD DVD has been developed. The data capacity of one side of an HD DVD-ROM or HD DVD-R is 15 GB that is three times or more the data capacity of the conventional DVD, i.e., 4.7 GB. An organic dye material is used in a recording layer of this HD DVD-R as described in, e.g., Jpn. Pat. Appln. KOKAI Publication Nos. 2006-205683 and 2005-271587.

Unfortunately, forming two recording layers in this HD DVD-R is much more difficult than forming two recording layers in the DVD-R because the density is high. In particular, the deterioration of signal characteristics in the outer circumference is serious.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, it is disclosed that an information recording medium having a plurality of recording layers and capable of recording and reproducing information by emitting a semiconductor laser of 450 nm or less to the recording layer, and a disk apparatus using the information recording medium, wherein when reproducing recorded information by detecting light reflected by the recording layer by using a light-detecting mechanism, letting x be the frequency of repetitive recording of a shortest mark length and shortest space length of the information, the ratio of the value of a highest level to the value of a level at x/190 of a sum signal detected by the light-detecting mechanism is lower than 32 dB, or the ratio of the average value of the amplitudes of signals of repetitive recording of the shortest mark length and shortest space length to the value of the highest level of the sum signal of the detected signals is higher than 10 dB, within a frequency range represented by x/3240 to x/190.

In the present invention, recording and reproduction can be well performed from the inner circumference to the outer circumference of an information recording medium having multiple recording layers in which recording and reproduction are performed by using a wavelength of 450 nm or less.

The present inventors made extensive studies to solve the problem of signal characteristic deterioration in the prior art described above, and have found that low-frequency noise has a large influence on the recording characteristics particular in the outer circumference.

When a shortest mark length and shortest space length are 0.204 μm, for example, the double of the shortest mark length is the length of one cycle of a repetitive recording pattern of the shortest mark and shortest space.

Length of one cycle=0.204 μm×2=0.408 μm

Also, when the rotational linear velocity of a disk is 6.61 m/s, a value obtained by dividing the disk rotational linear velocity by the length of one cycle, i.e., 6.61 (m/s)/0.408 μm=16.2$M$(1/s)=16.2 MHz is the frequency of repetitive recording of the shortest mark and shortest space. When this frequency is substituted into x of x/3240 to x/190 the frequency is 5 to 85 kHz. In this frequency band, the reflected light of a reproducing laser beam is measured using a spectrum analyzer. The spectrum analyzer was set such that the RBW (Resolution Band Width) was 1 kHz, and the VBW (Video Band Width) was 1 kHz, waveforms were input 64 times and averaged. The conditions were that a value at 85 kHz was the noise level, a peak value between 5 kHz and 85 kHz was the carrier level, and the C/N was (carrier level–noise level).

If the C/N value is higher than 32 dB, the recording/reproduction characteristics in the outer circumference often deteriorate.

An embodiment of the present invention can make the C/N lower than 32 dB.

In another embodiment of the present invention, a carrier level Cst of the pattern of the shortest mark length and shortest space length indicates the average value of the amplitudes of reproduction signals of repetitive recording of the shortest mark length and shortest space length, and the Cst/C is the ratio of the Cst to a peak value C between 5 kHz and 85 kHz. The other embodiment can make the Cst/C higher than 10 dB. If the Cst/C is equal to or lower than 10 dB, the error rate characteristic of a recording signal often deteriorates.

Still another embodiment of the present invention has the advantage that good recording/reproduction characteristics can be obtained from the inner circumference to the outer circumference of the information recording medium by making the C/N lower than 32 dB and the Cst/C higher than 10 dB.

Note that the C/N can be 0 (inclusive) to 32 (exclusive) dB from the practical viewpoint.

Note also that the Cst/C can be 10 (exclusive) to 60 (inclusive) dB from the practical viewpoint.

If the Cst/C is higher than 60 dB, the circuits of the apparatus saturate because the signal is too large. This often makes it impossible to correctly reproduce the signal.

Figure 1:
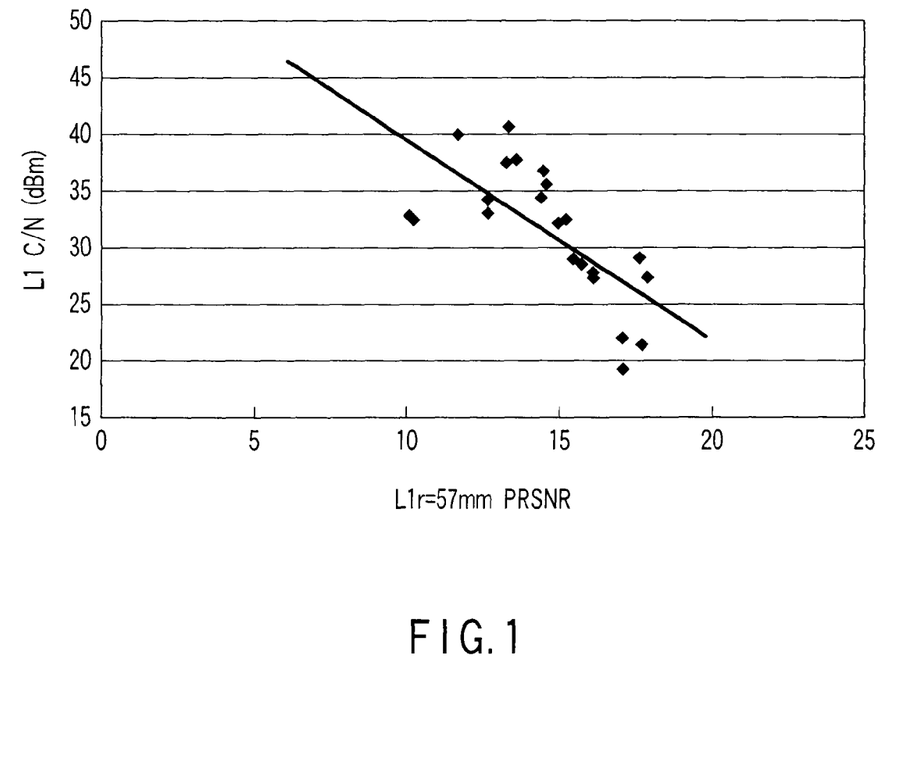
FIG. 1 is a graph showing the relationship between the C/N of an L1 layer at 5 to 85 kHz and the PRSNR of L1 when r=57 mm.

FIG. 1 shows the relationship between the C/N of an L1 recording layer at 5 to 85 kHz and the PRSNR when r=57 mm of the information recording medium according to the present invention.

The PRSNR stands for Partial Response Signal to Noise Ratio. The higher the value, the better the signal characteristics. In this embodiment, the drive can read data when the PRSNR is 12 or more. The PRSNR is preferably 15 or more.

The L1 recording layer is the second recording layer from the laser beam incident side.

Figure 2:
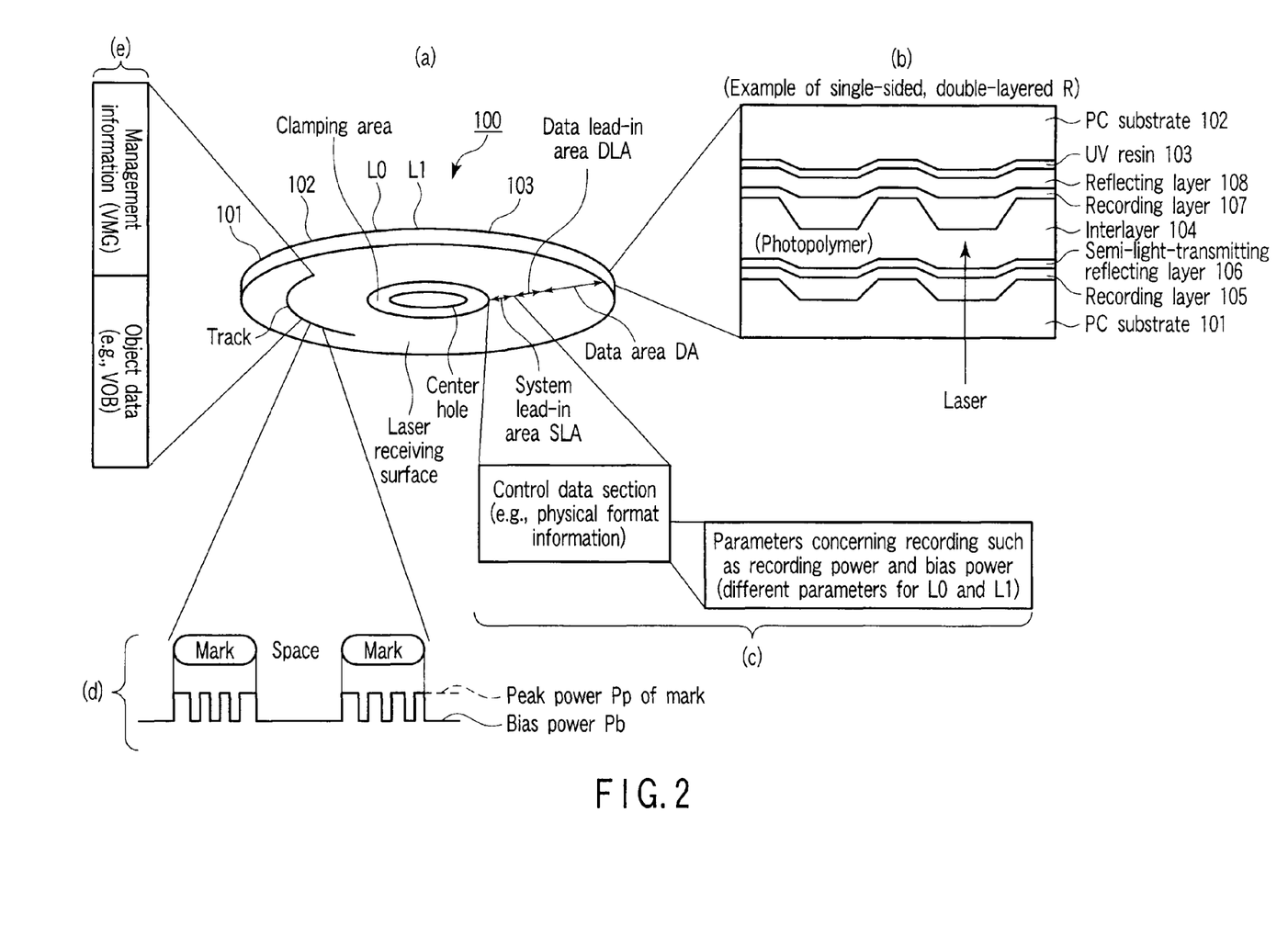
FIG. 2 is a view for explaining an example of the arrangement of an optical disk according to an embodiment of the present invention.

FIG. 2 is a view for explaining an example of the arrangement of a write-once, single-sided, double-layered optical disk 100 as an example of the optical disk according to an embodiment of the present invention. As indicated by (a) and (b) in FIG. 2, the optical disk 100 has a disk-like transparent resin substrate 101 made of a synthetic resin material such as polycarbonate (PC). The transparent resin substrate 101 has concentric grooves or a spiral groove. The transparent resin substrate 101 can be manufactured by injection molding by using a stamper.

An organic dye recording layer 105 as a first layer (L0) and a semi-light-transmitting reflecting layer 106 are sequentially stacked on the 0.59-mm thick transparent resin substrate 101 made of polycarbonate or the like, and a photopolymer (2P resin) 104 is formed on the semi-light-transmitting reflecting layer 106 by spin coating. The groove shape of a second layer (L1) is transferred onto the photopolymer 104, and an organic dye recording layer 107 as the second layer and a reflecting film 108 made of, e.g., silver or a silver alloy are sequentially stacked. A 0.59-mm thick transparent resin substrate (or dummy substrate) 102 is laminated on the substrate on which the L0 and L1 recording layers are stacked, with an UV-curing resin (adhesive layer) 103 interposed between the two substrates. The organic dye recording layers 105 and 107 form a two-layered structure in which the semi-transmitting reflecting layer 106 and interlayer 104 are sandwiched. The total thickness of the laminated optical disk thus obtained is about 1.2 mm.

A spiral groove having, e.g., a track pitch of 0.4 µm and a depth of 60 nm is formed (in each of the L0 and L1 layers) on the transparent resin substrate 101 or photopolymer 104. This groove wobbles, and address information is recorded on the wobble. The recording layers 105 and 107 containing an organic dye are formed on the transparent resin substrate 101 or photopolymer 104 so as to fill the groove.

As the organic dye forming the recording layers 105 and 107, it is possible to use an organic dye having a maximum absorption wavelength region shifted to wavelengths longer than the recording wavelength (e.g., 405 nm). Also, the organic dye is designed so as not to extinguish absorption in the recording wavelength region but to have a considerable light absorption in the long-wavelength region (e.g., 450 to 600 nm).

When dissolved in a solvent, the above-mentioned organic dye (practical examples will be described later) can be easily applied in the form of a liquid onto the surface of the transparent resin substrate by spin coating. In this case, the film thickness can be accurately controlled by controlling the ratio of dilution by the solvent and the rotational speed of spin coating.

Note that the light reflectance is low when focusing or tracking is performed on tracks by a recording laser beam before information is recorded. After that, the light reflectance of a recording mark portion rises because the laser beam causes a decomposition reaction of the dye and the light absorbance decreases. This achieves a so-called, Low-to-High (or L-to-H) characteristic by which the light reflectance of a recording mark portion formed by emitting the laser beam is higher than that before the laser beam is emitted.

In the embodiment of the present invention, an example of a physical format applied to the L0 and L1 layers existing on the transparent resin substrate 101 and photopolymer (2P resin) 104 is as follows. That is, general parameters of the write-once, single-sided, double-layered disk are almost the same as those of a single-layered disk, except that the recording capacity usable by a user is 30 GB, the inner diameter of a data area is 24.6 mm in layer 0 (the L0 layer) and 24.7 mm in layer 1 (the L1 layer), and the outer diameter of the data area is 58.1 mm (in both layers 0 and 1).

In the optical disk 100 indicated by (a) in FIG. 2, a system lead-in area SLA includes a control data section as indicated by (c) in FIG. 2. This control data section includes parameters concerning recording, such as the recording power (peak power) and bias power, as a part of physical format information and the like, for each of L0 and L1.

Also, as indicated by (d) in FIG. 2, mark/space recording is performed on tracks in a data area DA of the optical disk 100 by a laser having a predetermined recording power (peak power) and bias power. As indicated by (e) in FIG. 2, this mark/space recording records object data (e.g., VOB) of a high-resolution TV broadcasting problem or the like and management information (VMG) of the object data on the tracks (of L0 and/or L1) in the data area DA.

As the Low-to-High (or L-to-H) organic dye usable in the embodiment of the present invention, it is possible to use an organic dye including a dye portion and counterion (anion) portion, or an organic metal complex. As the dye portion, it is possible to use, e.g., a cyanine dye, styryl dye, porphyrin dye, or azo dye. A cyanine dye, styryl dye, and azo dye are particularly suitable because the absorptance to the recording wavelength is readily controllable.

When the transparent resin substrate is coated with a thin recording film containing a monomethine cyanine dye having a monomethine chain among other L-to-H organic dyes, the maximum absorption and the absorbance in the recording wavelength region (400 to 405 nm) can be easily adjusted to nearly 0.3 to 0.5, preferably, nearly 0.4. This makes it possible to improve the recording/reproduction characteristics, and well design both the light reflectance and recording sensitivity.

The anion portion of the organic dye is preferably an organic metal complex from the viewpoint of the optical stability as well. An organic metal complex containing cobalt or nickel as its central metal particularly has a high optical stability.

An azo metal complex or the like can be used as the organic metal complex. The azo metal complex has a high solubility when 2,2,3,3-tetrafluoro-1-propanol (TFP) is used as a solvent. This facilitates the preparation of a solution for spin coating. In addition, since the solution can be recycled after spin coating, the manufacturing cost of the information recording medium can be reduced.

Note that the organic metal complex can be dissolved in a TFP solution and applied by spin coating. When used in an information recording medium having two recording layers, the azo metal complex is particularly favorable as the L0 recording layer made of a thin Ag alloy layer because the azo metal complex hardly deforms after recording. Although Cu, Ni, Co, Zn, Fe, Al, Ti, V, Cr, or Y can be used as the central metal, Cu, Ni, and Co especially have a high reproducing light resistance. Cu has no genetic toxicity and improves the quality of a recording/reproduction signal.

Various materials can be used as ligands surrounding the central metal. Examples are dyes represented by formulas (D1) to (D6) below. It is also possible to form another structure by combining these ligands.

(D2)

(D3)

(D1)

(D4)

Figure 3:
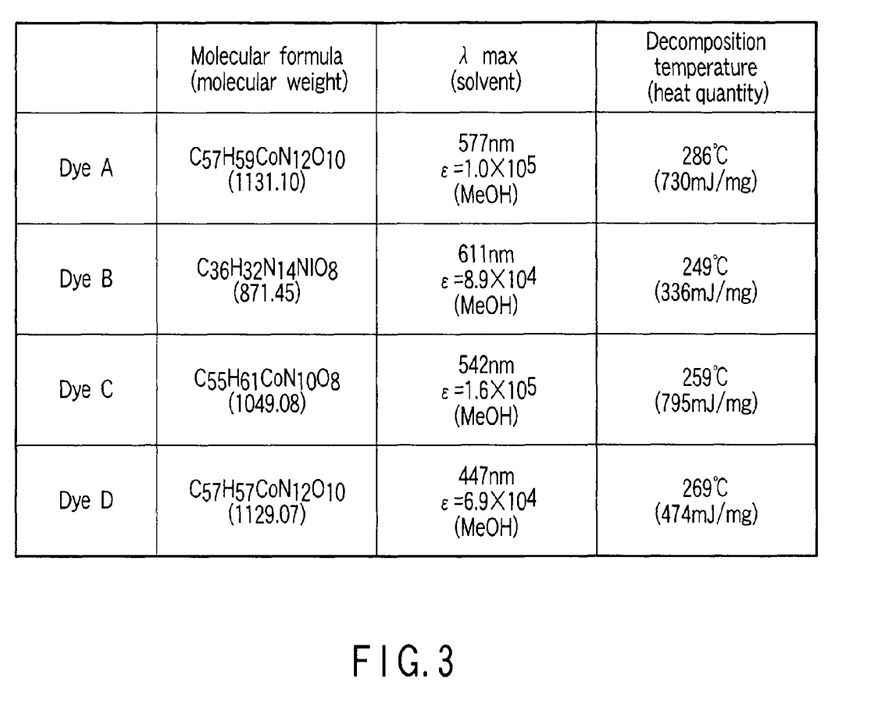
FIG. 3 is a view showing examples of organic dye materials usable as an L-to-H organic dye layer.

FIG. 3 shows four examples of dyes A to D as organic dye materials usable as the L-to-H organic dye layer usable in the present invention. The dye A has a styryl dye as a dye portion (cation portion) and azo metal complex 1 as an anion portion. The dye C has a styryl dye as a dye portion (cation portion) and azo metal complex 2 as an anion portion. The dye D has a monomethinecyanine dye as a dye portion (cation portion) and azo metal complex 1 as an anion portion. Note that an organic metal complex can also be used singly. As an example, the dye B is a nickel complex dye.

Formula (E1) below indicates the formula of the styryl dye as the dye portions of the dyes A and C. Formula (E2) below indicates the formula of the azo metal complex as the anion portions of the dyes A and C. Formula (E3) below indicates the formula of the monomethinecyanine dye as the dye portion of the dye D. Formula (E4) below indicates the formula of the azo metal complex as the anion portion of the dye D.

In the formula of the styryl dye, $Z_3$ represents an aromatic ring, and this aromatic ring may have a substituent group. $Y_{31}$ represents a carbon atom or hetero atom. $R_{31}$, $R_{32}$, and $R_{33}$ represent the same aliphatic hydrocarbon group or different aliphatic hydrocarbon groups, and these aliphatic hydrocarbon groups may have a substituent group. $R_{34}$ and $R_{35}$ each independently represent a hydrogen atom or appropriate substituent group. When $Y_{31}$ is a hetero atom, one or both of $R_{34}$ and $R_{35}$ do not exist.

In the formula of the monomethinecyanine dye, $Z_1$ and $Z_2$ represent the same aromatic ring or different aromatic rings, and these aromatic rings may have a substituent group. $Y_{11}$ and $Y_{12}$ each independently represent a carbon atom or hetero atom. $R_{11}$ and $R_{12}$ represent aliphatic hydrocarbon groups, and these aliphatic hydrocarbon groups may have a substituent group. $R_{13}$, $R_{14}$, $R_{15}$, and $R_{16}$ each independently represent a hydrogen atom or appropriate substituent group. When $Y_{11}$ and $Y_{12}$ are hetero atoms, some or all of $R_{13}$, $R_{14}$, $R_{15}$, and $R_{16}$ do not exist.

Examples of the monomethinecyanine dye used in this embodiment are dyes obtained by bonding identical or different cyclic nuclei which may have one or a plurality of substituent groups to the two ends of a monomethine chain which may have one or a plurality of substituent groups. Examples of the cyclic nuclei are an imidazoline ring, imidazole ring, benzoimidazole ring, α-naphthoimidazole ring, β-naphthoimidazole ring, indole ring, isoindole ring, indolenine ring, isoindolenine ring, benzoindolenine ring, pyridinoindolenine ring, oxazoline ring, oxazole ring, isoxazole ring, benzoxazole ring, pyridinoxazole ring, α-naphthoxazole ring, β-naphthoxazole ring, selenazoline ring, selenazole ring, benzoselenazole ring, α-naphthoselenazole ring, β-naphthoselenazole ring, thiazoline ring, thiazole ring, isothiazole ring, benzothiazole ring, α-naphthothiazole ring, β-naphthothiazole ring, tellurazoline ring, tellurazole ring, benzotellurazole ring, α-naphthotellurazole ring, β-naphthotellurazole ring, acridine ring, anthracene ring, isoquinoline ring, isopyrrole ring, imidanoxaline ring, indandione ring, indazole ring, indaline ring, oxadiazole ring, carbazole ring, xanthene ring, quinazoline ring, quinoxaline ring, quinoline ring, chroman ring, cyclohexanedione ring, cyclopentanedione ring, cinnoline ring, thiodiazole ring, thioxazolidone ring, thiophene ring, thionaphthene ring, thiobarbituric acid ring, thiohydantoin ring, tetrazole ring, triazine ring, naphthalene ring, naphthyridine ring, piperazine ring, pyrazine ring, pyrazole ring, pyrazoline ring, pyrazolidine ring, pyrazolone ring, pyran ring, pyridine ring, pyridazine ring, pyrimidine ring, pyrylium ring, pyrrolidine ring, pyrroline ring, pyrrole ring, phenazine ring, phenanthrizine ring, phenanthrene ring, phenanthroline ring, phtharazine ring, puterizine ring, furazane ring, furan ring, purine ring, benzene ring, benzoxazine ring, benzopyran ring, morpholine ring, and rhodanine ring.

In the formulas of the monomethinecyanine dye and styryl dye, $Z_1$ to $Z_3$ represent aromatic rings such as a benzene ring, naphthalene ring, pyridine ring, quinoline ring, and quinoxaline ring, and these aromatic rings may have one or a plurality of substituent groups. Examples of the substituent groups are aliphatic hydrocarbon groups such as a methyl group, trifluoromethyl group, ethyl group, propyl group, isopropyl group, butyl group, isobutyl group, sec-butyl group, tert-butyl group, pentyl group, isopentyl group, neopentyl group, tert-pentyl group, 1-methylpentyl group, 2-methylpentyl group, hexyl group, isohexyl group, 5-methylhexyl group, heptyl group, and octyl group; alicyclic hydrocarbon groups such as a cyclopropyl group, cyclobutyl group, cyclopentyl group, and cyclohexyl group; aromatic hydrocarbon groups such as a phenyl group, biphenylyl group, o-tolyl group, m-tolyl group, p-tolyl group, xylyl group, mesityl group, o-cumenyl group, m-cumenyl group, and p-cumenyl group; ether groups such as a methoxy group, trifluoromethoxy group, ethoxy group, propoxy group, isopropoxy group, butoxy group, sec-butoxy group, tert-butoxy group, pentyloxy group, phenoxy group, and benzoyloxy group; ester groups such as a methoxycarbonyl group, trifluoromethoxycarbonyl group, ethoxycarbonyl group, propoxycarbonyl group, acetoxy group, and benzoyloxy group; halogen groups such as a fluoro group, chloro group, bromo group, and iodo group; thio groups such as a methylthio group, ethylthio group, propylthio group, butylthio group, and phenylthio group; sulfamoyl groups such as a methylsulfamoyl group, dimethylsulfamoyl group, ethylsulfamoyl group, diethylsulfamoyl group, propylsulfamoyl group, dipropylsulfamoyl group, butylsulfamoyl group, and dibutylsulfamoyl group; amino groups such as a primary amino group, methylamino group, dimethylamino group, ethylamino group, diethylamino group, propylamino group, dipropylamino group, isopropylamino group, diisopropylamino group, butylamino group, dibutylamino group, and piperidino group; carbamoyl groups such as a methylcarbamoyl group, dimethylcarbamoyl group, ethylcarbamoyl group, diethylcarbamoyl group, propylcarbamoyl group, and dipropylcarbamoyl group; and a hydroxy group, carboxy group, cyano group, nitro group, sulfino group, sulfo group, and mesyl group. Note that in these formulas, $Z_1$ and $Z_2$ can be the same or different.

In the formulas of the monomethinecyanine dye and styryl dye, $Y_{11}$, $Y_{12}$, and $Y_{31}$ each represent a carbon atom or hetero atom. Examples of the hetero atom are group-XV and group-XVI atoms in the periodic table, such as a nitrogen atom, oxygen atom, sulfur atom, selenium atom, and tellurium atom. Note that the carbon atom represented by $Y_{11}$, $Y_{12}$, or $Y_{31}$ may also be an atomic group mainly containing two carbon atoms, such as an ethylene group or vinylene group. Note also that $Y_{11}$ and $Y_{12}$ in the formula of the monomethinecyanine dye can be the same or different.

In the formulas of the monomethinecyanine dye and styryl dye, $R_{11}$, $R_{12}$, $R_{13}$, $R_{32}$, and $R_{33}$ each represent an aliphatic hydrocarbon group. Examples of the aliphatic hydrocarbon group are a methyl group, ethyl group, propyl group, isopropyl group, isopropenyl group, 1-propenyl group, 2-propenyl group, butyl group, isobutyl group, sec-butyl group, tert-butyl group, 2-butenyl group, 1,3-butadienyl group, pentyl group, isopentyl group, neopentyl group, tert-pentyl group, 1-methylpentyl group, 2-methylpentyl group, 2-pentenyl group, hexyl group, isohexyl group, 5-methylhexyl group, heptyl group, and octyl group. This aliphatic hydrocarbon group may have one or a plurality of substituent groups similar to those of $Z_1$ to $Z_3$.

Note that $R_{11}$ and $R_{12}$ in the formula of the monomethinecyanine dye can be the same or different, and $R_{13}$, $R_{32}$, and $R_{33}$ in the formula of the styryl dye can be the same or different.

$R_{13}$ to $R_{16}$, $R_{34}$, and $R_{35}$ in the formulas of the monomethinecyanine dye and styryl dye each independently represent a hydrogen atom or appropriate substituent group in the individual formulas. Examples of the substituent group are aliphatic hydrocarbon groups such as a methyl group, trifluoromethyl group, ethyl group, propyl group, isopropyl group, butyl group, isobutyl group, sec-butyl group, tert-butyl group, pentyl group, isopentyl group, neopentyl group, tert-pentyl group, 1-methylpentyl group, 2-methylpentyl group, hexyl group, isohexyl group, 5-methylhexyl group, heptyl group, and octyl group; ether groups such as a methoxy group, trifluoromethoxy group, ethoxy group, propoxy group, butoxy group, tert-butoxy group, pentyloxy group, phenoxy group, and benzoyloxy group; halogen groups such as a fluoro group, chloro group, bromo group, and iodo group; and a hydroxy group, carboxy group, cyano group, and nitro group. Note that when $Y_{11}$, $Y_{12}$, and $Y_{31}$ are hetero atoms in the formulas of the monomethinecyanine dye and styryl dye, some or all of $R_{13}$ to $R_{16}$ in $Z_1$ and $Z_2$ and one or both of $R_{34}$ and $R_{35}$ in $Z_3$ do not exist.

In the formula of the azo metal complex, A and A' represent 5- to 10-membered heterocyclic groups which are the same or different and each contain one or a plurality of hetero atoms selected from a nitrogen atom, oxygen atom, sulfur atom, selenium atom, and tellurium atom. Examples of the heterocyclic groups are a furyl group, thienyl group, pyrrolyl group, pyridyl group, piperidino group, piperidyl group, quinolyl group, and isoxazolyl group. This heterocyclic group may have one or a plurality of substituent groups. Examples of the substituent groups are aliphatic hydrocarbon groups such as a methyl group, trifluoromethyl group, ethyl group, propyl group, isopropyl group, butyl group, isobutyl group, sec-butyl group, tert-butyl group, pentyl group, isopentyl group, neopentyl group, tert-pentyl group, 1-methylpentyl group, 2-methylpentyl group, hexyl group, isohexyl group, and 5-methylhexyl group; ester groups such as a methoxycarbonyl group, trifluoromethoxycarbonyl group, ethoxycarbonyl group, propoxycarbonyl group, acetoxy group, trifluoroacetoxy group, and benzoyloxy group; aromatic hydrocarbon groups such as a phenyl group, biphenylyl group, o-tolyl group, m-tolyl group, p-tolyl group, o-cumenyl group, m-cumenyl group, p-cumenyl group, xylyl group, mesityl group, styryl group, cinnamoyl group, and naphthyl group; and a carboxy group, hydroxy group, cyano group, and nitro group.

Note that an azo compound forming the azo-based organic metal complex represented by the formula can be obtained in accordance with the conventional method by reacting diazonium salt having $R_{21}$ and $R_{22}$ or $R_{23}$ and $R_{24}$ corresponding to the formula with a heterocyclic compound having an active methylene group adjacent to a carbonyl group in a molecule. Examples of the heterocyclic compound are an isoxazolone compound, oxazolone compound, thionaphthene compound, pyrazolone compound, barbituric acid compound, hydantoin compound, and rhodanine compound. $Y_{21}$ and $Y_{22}$ represent hetero atoms which are the same or different and selected from group-XVI elements in the periodic table, e.g., an oxygen atom, sulfur atom, selenium atom, and tellurium atom.

The azo metal complex represented by the formula is normally used in the form of a metal complex in which one or a plurality of azo metal complexes are coordinated around a metal (central atom). Examples of a metal element serving as the central atom are scandium, yttrium, titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, and mercury, and cobalt is particularly favorable.

Figure 4A:
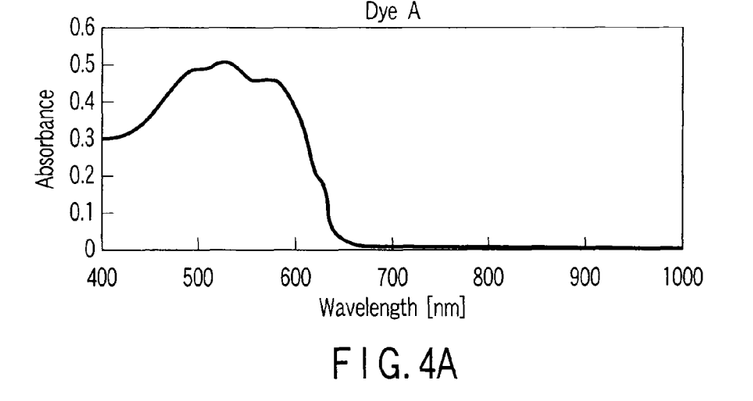
FIGS. 4A to 4C are graphs each showing the relationship between the laser beam wavelength and absorbance for a predetermined dye.
Figure 4B:
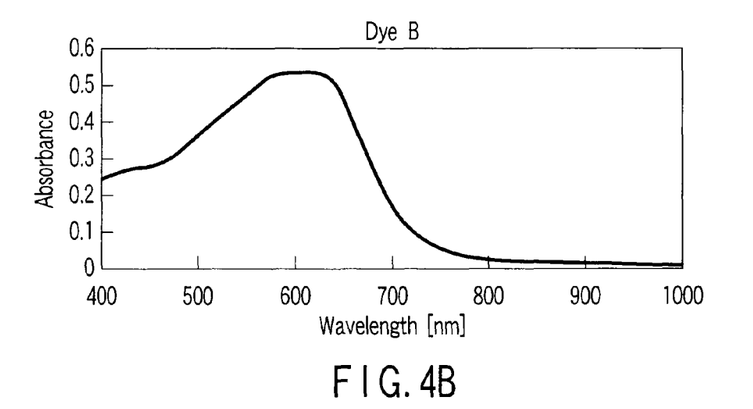
Figure 4C:
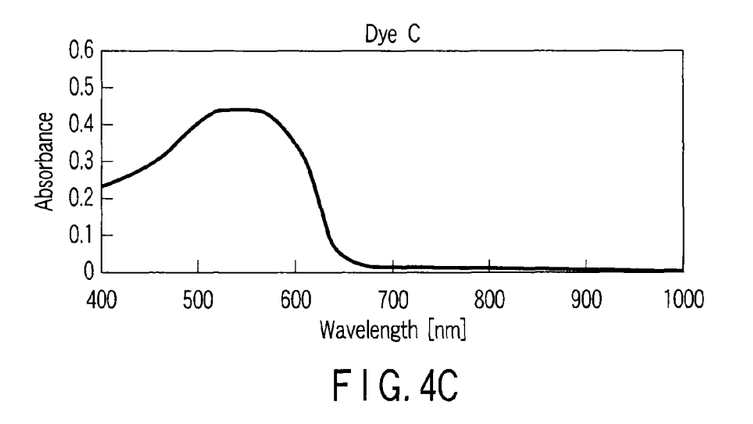

FIG. 4A shows the change in absorbance of the dye A to the wavelength of an emitted laser beam. FIG. 4B shows the change in absorbance of the dye B to the wavelength of an emitted laser beam. FIG. 4C shows the change in absorbance of the dye C to the wavelength of an emitted laser beam.

Figure 5A:
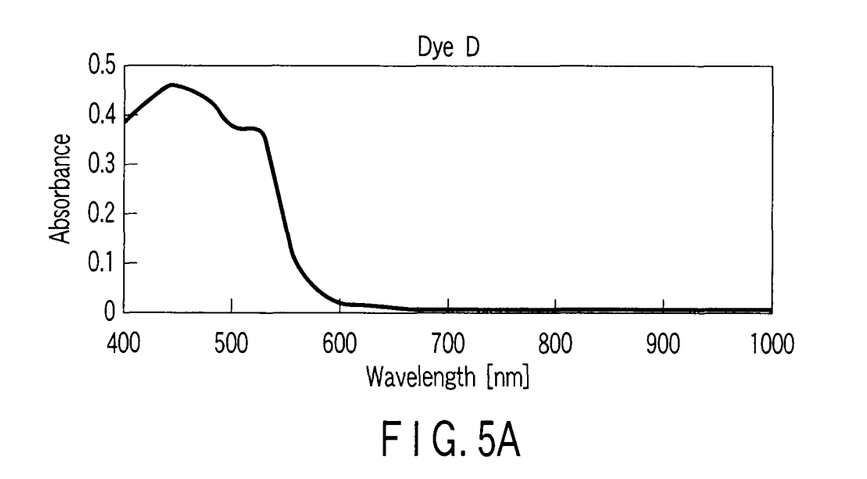
FIGS. 5A and 5B are graphs each showing the relationship between the laser beam wavelength and absorbance for a predetermined dye.
Figure 5B:
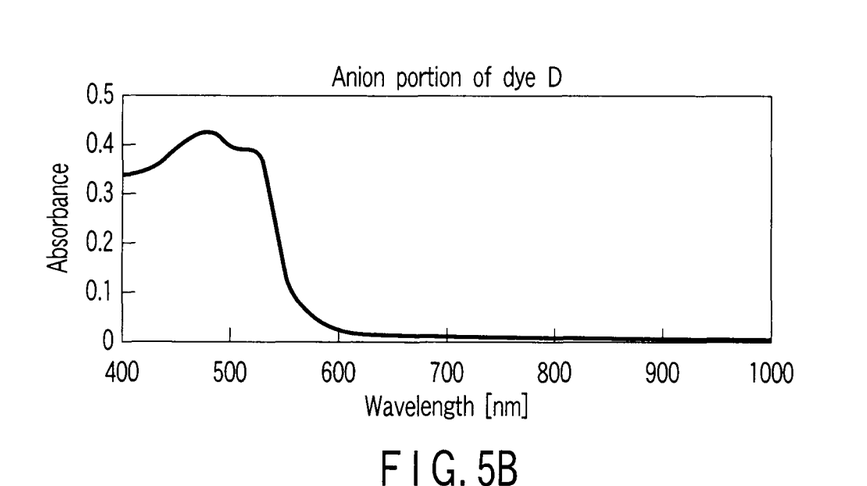

FIG. 5A shows the change in absorbance of the dye D to the wavelength of an emitted laser beam. FIG. 5B shows the change in absorbance of the anion portion of the dye D to the wavelength of an emitted laser beam.

As is evident from the characteristics shown in FIGS. 4A to 5B, the dyes A to D each have a maximum absorption wavelength region shifted to wavelengths longer than the recording wavelength (405 nm). The write-once optical disk explained in this embodiment comprises the recording film containing the organic dye having the characteristics as described above, and is given the so-called L-to-H characteristic by which the light reflectance after laser beam emission is higher than that before laser beam emission. Even when a short-wavelength laser beam such as a blue laser beam is used, therefore, this write-once optical disk is superior in, e.g., storage durability, reproduction signal S/N ratio, and bit error rate, and capable of recording and reproducing information at a high density with performance on a well practical level.

That is, in this write-once optical disk, the maximum absorption wavelength of the recording film containing the organic dye is longer than the wavelength of the recording laser beam. Since this makes it possible to reduce the absorption of short-wavelength light such as ultraviolet radiation, the optical stability and the reliability of information recording/reproduction improve.

Also, since the light reflectance is low when information is recorded, no cross write occurs owing to reflective diffusion. Therefore, even when information is recorded on an adjacent track, it is possible to reduce the deterioration of the reproduction signal S/N ratio and bit error rate. Furthermore, the contrast and resolution of a recording mark can be kept high even against heat. This facilitates recording sensitivity design.

When a dye having a maximum absorption wavelength region shifted to wavelengths shorter than the recording wavelength (405 nm) is used as the recording film, the write-once optical disk explained in this embodiment is given a so-called H-to-L characteristic by which the light reflectance after laser beam emission is lower than that before laser beam emission. Even when a short-wavelength laser beam such as a blue laser beam is used, therefore, this write-once optical disk has a high reflectance, is superior in, e.g., reproduction signal S/N ratio and bit error rate, and is capable of recording and reproducing information at a high density with performance on a well practical level.

That is, in this write-once optical disk, the maximum absorption wavelength of the recording film containing the organic dye is shorter than the wavelength of the recording laser beam. Since this makes it possible to absorb or more or less reflect short-wavelength light such as ultraviolet radiation, the optical stability and the reliability of information recording/reproduction improve.

Furthermore, the contrast and resolution of a recording mark can be kept high even against heat. This facilitates recording sensitivity design.

EXAMPLE

A transparent resin substrate 120 mm in diameter and 0.6 mm in thickness having concentric grooves and lands or a spiral groove and land on the surface and made of, e.g., polycarbonate was prepared.

A 1.2-wt % 2,2,3,3-tetrafluoro-1-propanol (TFP) solution of an organic dye represented by formula (D1) described previously was prepared.

Subsequently, an organic dye layer was formed on the transparent resin substrate by coating it with the TFP solution by spin coating. The thickness from the groove bottom of the organic dye layer after coating was 60 nm. A 100-nm thick light-reflecting layer made of an Ag alloy was stacked on the obtained organic dye layer by sputtering, thereby obtaining a recording layer in which the organic dye layer and light-reflecting layer were stacked.

In addition, the light-reflecting layer was coated with a UV-curing resin by spin coating, and a transparent resin substrate 102 having a thickness of 0.60 mm was laminated on the UV-curing resin, thereby obtaining a single-sided, double-layered, write-once information recording medium.

The dye represented by formula (D1) was an organic metal complex.

Using the information storage medium (a single-sided dual-layer evaluation disc) produced as described above, an experiment for evaluating a reproduction signal is performed.

Figure 6:
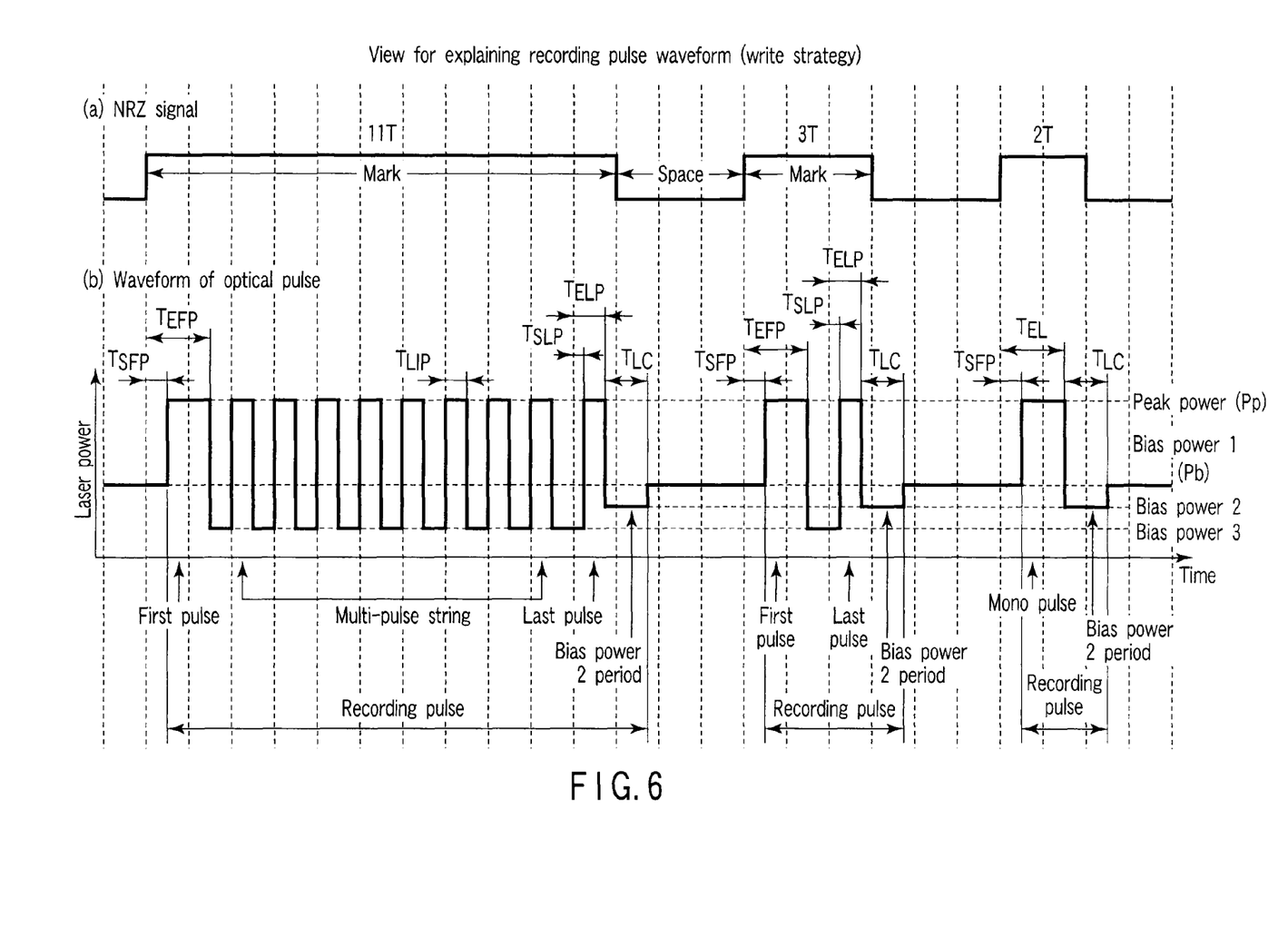
FIG. 6 is a timing chart showing a method of recording rewritable data on a write-once information storage medium according to the first embodiment.

The apparatus used for evaluation is optical disc evaluation apparatus ODU-1000 manufactured by Pulstec Industrial Co., Ltd. This apparatus has a laser wavelength of 405 nm and NA of 0.65. The linear velocity in recording and reproduction is selected to be 6.61 m/s. A recording signal is 8-12 modulated random data, and information is recorded by using a laser waveform containing a given recording power and two bias powers 1 and 2 as shown in FIG. 6. The recording conditions applied to the evaluation are as follows.

Explanation on Recording Conditions
(Information of Write Strategy)

Referring to FIG. 6, a description will be given with respect to a recording waveform (exposure condition at the time of recording) used when the optimal recording power is checked. The exposure levels at the time of recording have four levels of recording power (peak power), bias power 1, bias power 2, and bias power 3. When long (4T or more)

recording mark 9 is formed, modulation is carried out in the form of multi-pulses between recording power (peak power) and bias power 3. In the embodiment, in any of the H format and B format systems, a minimum mark length relevant to channel bit length T is obtained as 2T. In the case where the minimum mark of 2T is recorded, one write pulse of the recording power (peak power) level after bias power 1 is used as shown in FIG. 6, and bias power 2 is temporarily obtained immediately after the write pulse. In the case where 3T recording mark 9 is recorded, bias power 2 is temporarily used after exposing two write pulses, a first pulse and a last pulse of recording power (peak power) level that follows bias power 1. In the case where recording mark 9 having a length of 4T or more is recorded, bias power 2 is used after the exposure is made with multi-pulse and write pulse.

The vertical dashed line in FIG. 6 shows a channel clock cycle. When a 2T minimum mark is recorded, the laser power is raised at a position delayed by TSFP from the clock edge, and fallen at a position delayed by TELP from the one-clock passing portion. The just-subsequent cycle during which the laser power is set at bias power 2 is defined as TLC. Values of TSFP, TELP, and TLC are recorded in physical format information PFI contained in control data zone CDZ in the case of the H format.

In the case where a 3T or more long recording mark is formed, the laser power is risen at a position delayed by TSFP from the clock edge, and lastly, ended with a last pulse. Immediately after the last pulse, the laser power is kept at bias power 2 during the period of TLC. Shift times from the clock edge to the rise/fall timing of the last pulse are defined as TSLP, TELP. In addition, a shift time from the clock edge to the fall timing of the last pulse is defined as TEFP, and further, an interval of a single pulse of the multi-pulse is defined as TMP.

Each of intervals TELP-TSFP, TMP, TELP-TSLP, and TLC is defined as a half-value wide relevant to the maximum value. In addition, in the embodiment, the above parameter setting ranges are defined as follows:

$$0.25T \leq TSFP \leq 1.50T \quad \text{(eq. 01)}$$

$$0.00T \leq TELP \leq 1.00T \quad \text{(eq. 02)}$$

$$1.00T \leq TEFP \leq 1.75T \quad \text{(eq. 03)}$$

$$-0.10T \leq TSLP \leq 1.00T \quad \text{(eq. 04)}$$

$$0.00T \leq TLC \leq 1.00T \quad \text{(eq. 05)}$$

$$0.15T \leq TMP \leq 0.75T \quad \text{(eq. 06)}$$

Further, in the embodiment, the values of the above described parameters can be changed or modified according to the recording mark length (Mark Length) and the immediately preceding/immediately succeeding space length (Leading/Trailing space length).

In this embodiment, the shortest mark length is 0.204 μm, and the disk rotational linear velocity is 6.61 m/s. Therefore, the frequency of the repetitive pattern of the shortest mark and shortest space is 16.2 MHz. When this frequency is substituted into x of $$x/3240 \text{ to } x/190$$

the range to be measured by a spectrum analyzer is 5 to 85 kHz. Within this range, the N level was −89.8 dBm at 85 kHz, and the highest level (C level) was −66.7 dBm. From the results, the C/N was 23.1 dB (=value of C level−value of N level). When information was recorded, the PRSNR was 18.7 in the inner circumference of L0, 17.6 in the outer circumference of L0, 23.1 in the inner circumference of L1, and 17.0 in the outer circumference of L1. That is, it was possible to obtain favorable recording characteristics from the inner circumference to the outer circumference. When 2T as the shortest mark was repetitively recorded with this optimum recording power (the recording power by which the highest SbER and PRSNR were obtained), the carrier level (Cst) measured by the spectrum analyzer was −43.5 dB. The Cst/C was 23.2 dB.

The carrier level (Cst) indicates the average value of the amplitudes of reproduction signals obtained when 2T was repetitively recorded with the optimum recording power and then reproduced.

Comparative Example

An information recording medium was manufactured following the same procedures as in the example, and information was recorded. Within the range of 5 to 85 kHz, the N level was −89.0 dBm at 85 kHz, and the C level was −49.7 dBm. From the results, the C/N was 39.3 dB. When information was recorded, the PRSNR was 20.9 in the inner circumference of L0, 19.8 in the outer circumference of L0, 21.2 in the inner circumference of L1, and 11.4 in the outer circumference of L1. That is, it was possible to obtain favorable recording characteristics in the inner circumferences of L0 and L1, but the characteristics deteriorated in the outer circumferences. When 2T as the shortest mark was repetitively recorded with this optimum recording power (the recording power by which the highest SbER and PRSNR were obtained), the Cst measured by a spectrum analyzer was −45.0 dB. The Cst/C was 4.7 dB.

In this comparative example, the characteristics deteriorated in the outer circumferences although the information recording medium was manufactured following the same procedures as in the above embodiment. This is so because the signal characteristics deteriorate in the outer circumferences owing to a high density resulting from two layers.

The present invention can simply evaluate a medium in which the characteristics deteriorate by the method as described above, and can select only a medium by which good signal characteristics can be obtained from the inner circumference to the outer circumference.

Note that the present invention is not limited to the above example and, when carried out at present or in the future, can be variously modified without departing from the spirit and scope of the invention on the basis of techniques usable at that time. For example, the present invention can also be carried out not only on a double-layered disk but also on an optical disk having three or more recording layers that will be put into practical use in the future.

An optical disk apparatus for reproducing information recorded on the above-mentioned optical disk will be explained below.

Figure 7:
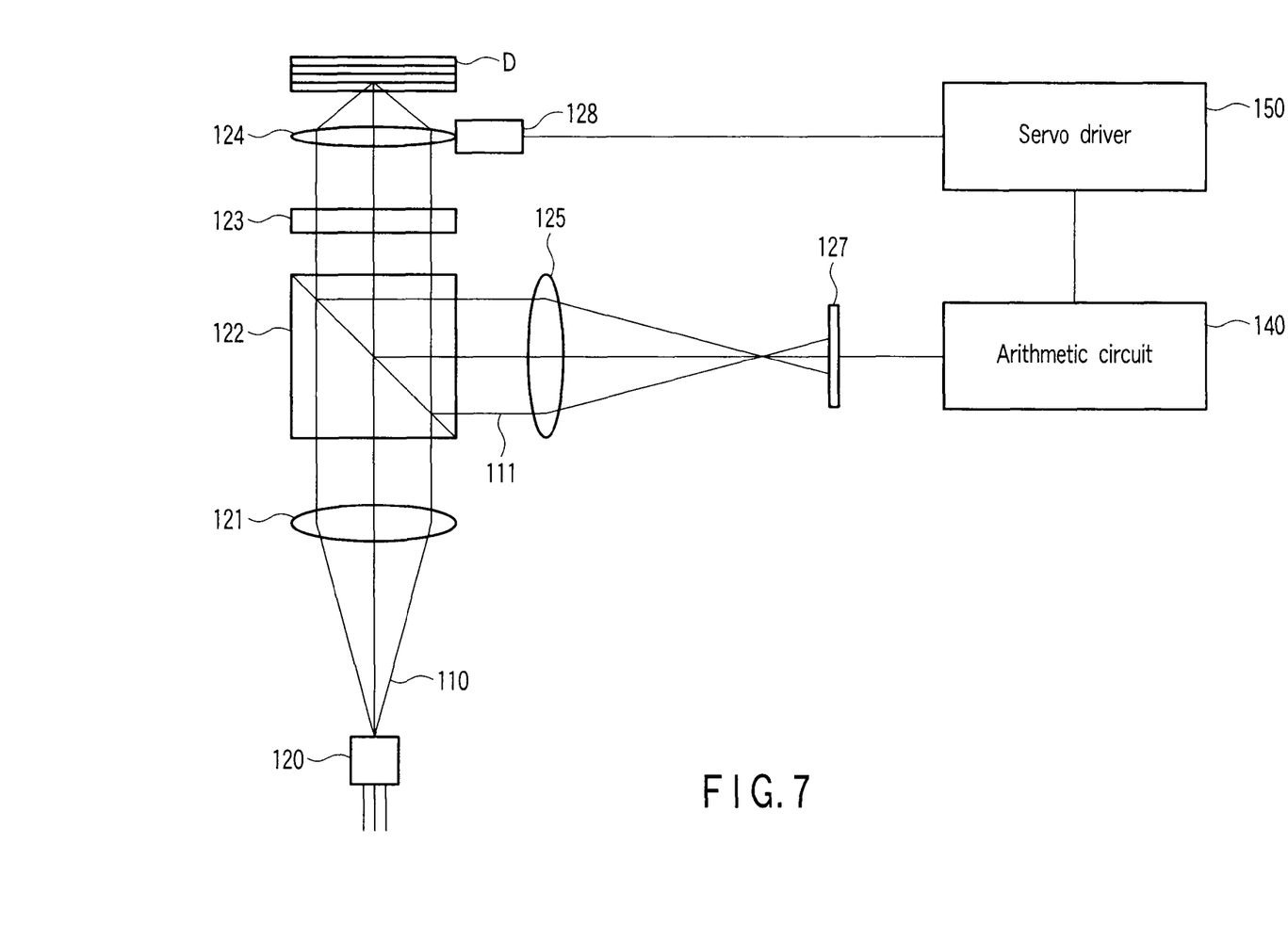
FIG. 7 is a block diagram showing an outline of the arrangement of an optical disk apparatus for playing back an optical disk.

FIG. 7 is a block diagram showing an outline of the arrangement of the optical disk apparatus for playing back an optical disk.

As shown in FIG. 7, an optical disk is, e.g., the single-sided, double-layered optical disk shown in FIG. 2. A short-wavelength semiconductor laser source 120 is used as the light source. The wavelength of the exit beam is in, e.g., a violet wavelength band of 400 to 410 nm. An exit beam 110 from the semiconductor laser source 120 is collimated into a parallel beam by a collimating lens 121, and enters an objective lens 124 through a polarizing beam splitter 122 and λ/4 plate 123. After that, the beam 110 is focused on each information recording layer through the substrate of the optical disk D.

Reflected light 111 from the information recording layer of the optical disk D is transmitted through the substrate of the optical disk D again, and reflected by the polarizing beam splitter 122 through the objective lens 124 and λ/4 plate 123. After that, the reflected light 111 enters a light-detecting mechanism through a condenser lens 125.

The light-detecting mechanism includes a photodetector 127 and an I/V amplifier (current-to-voltage converter) that is not shown. A light-receiving portion of the photodetector 127 is normally divided into a plurality of portions, and each light-receiving portion outputs an electric current corresponding to the light intensity. The I/V amplifier (current-to-voltage converter) converts the output electric current into a voltage, and applies the voltage to an arithmetic circuit 140. The arithmetic circuit 140 calculates, e.g., a tilt error signal, HF signal, focusing error signal, and tracking error signal from the input voltage signal. The tilt error signal is used to perform tilt control. The HF signal is used to reproduce information recorded on the optical disk D. A sum signal used in the present invention is this HF signal. The focusing error signal is used to perform focusing control. The tracking error signal is used to perform tracking control.

An actuator 128 can drive the objective lens 124 in the vertical direction, disk radial direction, and tilt direction (the radial direction or/and tangential direction). A servo driver 150 controls the actuator 128 so that the objective lens 124 follows information tracks on the optical disk D. Note that there are two different tilt directions. One is "a radial tilt" that occurs when the disk surface inclines toward the center of an optical disk. The other is "a tangential tilt" that occurs in the tangential direction of a track. A tilt that generally occurs owing to the warpage of a disk is the radial tilt. It is necessary to take account of not only a tilt that occurs during the manufacture of a disk but also a tilt that occurs owing to a change with time or a rapid change in use environment. The optical disk of the present invention can be played back by using the optical disk apparatus like this.

Also, the individual embodiments may also be appropriately combined as much as possible when practiced. In this case, the combined effects can be obtained. Furthermore, these embodiments include inventions in various stages, so various inventions can be extracted by properly combining a plurality of disclosed constituent elements. For example, even when some of all the constituent elements disclosed in the embodiments are deleted, an arrangement from which these constituent elements are deleted can be extracted as an invention.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A write-once or rewritable optical disc comprising a recording layer configured to record or reproduce information using light with a predetermined wavelength, the information configured to be recorded on the recording layer using a mark and a space, wherein a channel clock period is represented by T, the channel clock period T being provided for recording the mark on the recording layer where the mark regarding 3T can be recorded, a plurality of pulses including a last pulse arranged at an end of the pulses are used to record the mark regarding 3T, the mark regarding 3T being configured to be recorded with a condition that a width of the last pulse is 0T at minimum and 1.10T at maximum, in which a first subsequent level lower than a peak power level of the last pulse is arranged next to the last pulse, and a second subsequent level lower than the peak power level of the last pulse but higher than a power level of the first subsequent level is arranged next to the first subsequent level, and the plurality of pulses include a preceding pulse arranged before the last pulse, the preceding pulse having the peak power level, and a third level, lower than the first subsequent level, being arranged between the preceding pulse and the last pulse.

2. A method of recording information on a write-once or rewritable optical disc having a recording layer configured to record or reproduce information using light with a predetermined wavelength, the information configured to be recorded on the recording layer using a mark and a space, wherein a channel clock period is represented by T, the channel clock period T being provided for recording the mark on the recording layer where the mark regarding 3T can be recorded, a plurality of pulses including a last pulse arranged at an end of the pulses are used to record the mark regarding 3T, the mark regarding 3T being configured to be recorded with a condition that a width of the last pulse is 0T at minimum and 1.10T at maximum, in which a first subsequent level lower than a peak power level of the last pulse is arranged next to the last pulse, and a second subsequent level lower than the peak power level of the last pulse but higher than a power level of the first subsequent level is arranged next to the first subsequent level, and the plurality of pulses include a preceding pulse arranged before the last pulse, the preceding pulse having the peak power level, and a third level, lower than the first subsequent level, being arranged between the preceding pulse and the last pulse, the method comprising:

recording the information on the recording layer using the light.

3. A method of reproducing information from a write-once or rewritable optical disc having a recording layer configured to record or reproduce information using light with a predetermined wavelength, the information configured to be recorded on the recording layer using a mark and a space, wherein a channel clock period is represented by T, the channel clock period T being provided for recording the mark on the recording layer where the mark regarding 3T can be recorded, a plurality of pulses including a last pulse arranged at an end of the pulses are used to record the mark regarding 3T, the mark regarding 3T being configured to be recorded with a condition that a width of the last pulse is 0T at minimum and 1.10T at maximum, in which a first subsequent level lower than a peak power level of the last pulse is arranged next to the last pulse, and a second subsequent level lower than the peak power level of the last pulse but higher than a power level of the first subsequent level is arranged next to the first subsequent level, and the plurality of pulses include a preceding pulse arranged before the last pulse, the preceding pulse having the peak power level, and a third level, lower than the first subsequent level, being arranged between the preceding pulse and the last pulse, the method comprising:

reproducing the information from the recording layer using the light.

4. A disc drive for reproducing information from a write-once or rewritable optical disc having a recording layer configured to record or reproduce information using light with a predetermined wavelength, the information configured to be recorded on the recording layer using a mark and a space, wherein a channel clock period is represented by T, the channel clock period T being provided for recording the mark on the recording layer where the mark regarding 3T can be recorded, a plurality of pulses including a last pulse arranged at an end of the pulses are used to record the mark regarding 3T, the mark regarding 3T being configured to be recorded with a condition that a width of the last pulse is 0T at minimum and 1.10T at maximum, in which a first subsequent level lower than a peak power level of the last pulse is arranged next to the last pulse, and a second subsequent level lower than the peak power level of the last pulse but higher than a power level of the first subsequent level is arranged next to the first subsequent level, and the plurality of pulses include a preceding pulse arranged before the last pulse, the preceding pulse having the peak power level, and a third level, lower than the first subsequent level, being arranged between the preceding pulse and the last pulse, the disc drive comprising:

a light emitter configured to emit light to the recording layer;

a light receiver configured to receive light reflected from the recording layer to which the light is emitted; and a reproducer configured to reproduce the information from the recording layer, based on the reflected light.

* * * * *